US011879691B2

(12) United States Patent
Gerstler et al.

(10) Patent No.: US 11,879,691 B2
(45) Date of Patent: Jan. 23, 2024

(54) COUNTER-FLOW HEAT EXCHANGER

(71) Applicant: General Electric Company, Schenectady, NY (US)

(72) Inventors: William Dwight Gerstler, Niskayuna, NY (US); Douglas Carl Hofer, Niskayuna, NY (US); Adegboyega Masud Makinde, Austin, TX (US); Stephen Francis Rutkowski, Niskayuna, NY (US); Chiranjeev S. Kalra, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 218 days.

(21) Appl. No.: 16/621,019

(22) PCT Filed: Jun. 12, 2017

(86) PCT No.: PCT/US2017/037059
§ 371 (c)(1),
(2) Date: Dec. 10, 2019

(87) PCT Pub. No.: WO2018/231194
PCT Pub. Date: Dec. 20, 2018

(65) Prior Publication Data
US 2020/0103178 A1 Apr. 2, 2020

(51) Int. Cl.
*F28D 21/00* (2006.01)
*F28F 9/013* (2006.01)
(Continued)

(52) U.S. Cl.
CPC ........ *F28D 21/0003* (2013.01); *F28F 9/0132* (2013.01); *F28D 1/0246* (2013.01);
(Continued)

(58) Field of Classification Search
CPC ..... F28D 7/0008–0033; F28D 21/0003; F28D 21/001; F28D 2021/0024;
(Continued)

(56) References Cited

U.S. PATENT DOCUMENTS

| 596,330 | A | * | 12/1897 | Maiche | F28F 7/02 |
| | | | | | 165/164 |
| 1,571,068 | A | * | 1/1926 | Stancliffe | F28F 7/02 |
| | | | | | 165/165 |

(Continued)

FOREIGN PATENT DOCUMENTS

| CN | 103 206 876 B | 1/2015 |
| DE | 11 05 894 B | 5/1961 |

(Continued)

OTHER PUBLICATIONS

KR-101464889B1-English_machine_translation.pdf (Year: 2014).*
(Continued)

*Primary Examiner* — Joel M Attey
(74) *Attorney, Agent, or Firm* — Armstrong Teasdale LLP

(57) ABSTRACT

A counter-flow heat exchanger including a core region and a plenum region. The core region including a first set of heat exchanging passageways and a second set of heat exchanging passageways disposed at least partially therein. A plenum region is disposed adjacent opposed distal ends of the core region. Each of the plenum regions including a fluid inlet plenum, a fluid outlet plenum and a tube plate disposed therebetween. The first set of heat exchanging passageways is truncated and defines a first tube-side fluid flow path in a first direction. The second set of heat exchanging passageways defines a second tube-side fluid flow path in a second opposing direction. Each of the heat exchanging passageways extending from a fluid inlet plenum to a fluid outlet plenum. The tube plates and the core region include one of a cast metal formed thereabout each of the heat exchanging
(Continued)

passageways or a braze bond formed between each of the heat exchanging passageways.

20 Claims, 8 Drawing Sheets

(51) Int. Cl.
  *F28D 7/00* (2006.01)
  *F28F 9/18* (2006.01)
  *F28F 7/02* (2006.01)
  *F28D 1/02* (2006.01)
  *F28F 9/02* (2006.01)
  *F28F 1/00* (2006.01)

(52) U.S. Cl.
  CPC .......... *F28D 7/0008* (2013.01); *F28D 7/0025* (2013.01); *F28D 21/001* (2013.01); *F28D 2021/0024* (2013.01); *F28D 2021/0026* (2013.01); *F28F 1/006* (2013.01); *F28F 7/02* (2013.01); *F28F 9/013* (2013.01); *F28F 9/0246* (2013.01); *F28F 9/182* (2013.01); *F28F 2009/0287* (2013.01); *F28F 2225/04* (2013.01); *F28F 2235/00* (2013.01); *F28F 2240/00* (2013.01); *F28F 2250/102* (2013.01); *F28F 2255/14* (2013.01)

(58) Field of Classification Search
  CPC .......... F28D 2021/0026; F28D 21/0001–0014; F28D 2021/0021; F28F 1/006; F28F 9/013; F28F 9/0132; F28F 2009/0287; F28F 9/182; F28F 9/0246; F28F 2225/04; F28F 2235/00; F28F 2240/00; F28F 2255/14–146
  See application file for complete search history.

(56) References Cited

U.S. PATENT DOCUMENTS

| | | | | |
|---|---|---|---|---|
| 1,799,626 | A * | 4/1931 | Keith, Jr. | F28F 7/02 165/165 |
| 2,004,390 | A * | 6/1935 | Benzinger | F28B 9/08 165/71 |
| 2,335,687 | A * | 11/1943 | Modine | F28F 13/06 138/38 |
| 2,401,797 | A * | 6/1946 | Rasmussen | F28F 13/003 210/185 |
| 3,297,081 | A * | 1/1967 | Nunemaker | F28F 9/0221 165/159 |
| 3,422,884 | A * | 1/1969 | Otten | F16L 3/2235 165/67 |
| 3,583,156 | A * | 6/1971 | Schabert | G21D 5/08 376/391 |
| 3,907,026 | A * | 9/1975 | Mangus | F28F 23/00 165/70 |
| 3,967,677 | A * | 7/1976 | Mohlman | F28F 9/0132 165/162 |
| 3,971,211 | A * | 7/1976 | Wethe | F01K 7/32 60/39.181 |
| 3,999,602 | A * | 12/1976 | Fewell | F22B 1/063 165/70 |
| 4,101,287 | A | 7/1978 | Sweed et al. | |
| 4,235,361 | A * | 11/1980 | Hays | F17C 1/04 228/173.6 |
| 4,289,198 | A * | 9/1981 | Young | F28F 9/22 165/159 |
| 4,312,184 | A * | 1/1982 | Mangus | F01K 7/16 165/104.31 |
| 4,782,892 | A * | 11/1988 | Ostbo | F28F 7/02 165/DIG. 397 |
| 4,949,553 | A * | 8/1990 | Suzuki | B60H 1/00007 165/42 |
| 4,962,296 | A * | 10/1990 | Ostbo | F28D 7/0041 392/484 |
| 5,107,926 | A * | 4/1992 | Calleson | F28D 1/05383 165/173 |
| 5,309,637 | A * | 5/1994 | Moriarty | B23P 15/26 228/183 |
| 5,531,268 | A * | 7/1996 | Hoshino | F28F 1/025 165/149 |
| 7,285,153 | B2 * | 10/2007 | Bruun | F28F 7/02 165/DIG. 395 |
| 8,051,902 | B2 * | 11/2011 | Kappes | F28D 7/0008 165/174 |
| 8,272,233 | B2 * | 9/2012 | Yoshimura | F28F 9/0246 62/513 |
| 8,607,850 | B2 * | 12/2013 | Kappes | F28F 7/02 210/741 |
| 9,134,072 | B2 * | 9/2015 | Roisin | F28D 7/0041 |
| 2001/0040025 | A1 * | 11/2001 | Jurisich | F28D 1/0246 165/148 |
| 2003/0010488 | A1 * | 1/2003 | Watanabe | F28D 1/0408 165/202 |
| 2003/0066636 | A1 * | 4/2003 | Kawakubo | F28D 7/0025 165/164 |
| 2003/0173720 | A1 * | 9/2003 | Musso | C04B 35/00 264/635 |
| 2004/0040280 | A1 * | 3/2004 | Nirmalan | F02C 7/08 60/39.511 |
| 2004/0220358 | A1 * | 11/2004 | Zoller | C08F 10/02 526/64 |
| 2004/0224210 | A1 * | 11/2004 | Agnew | F02C 3/34 60/772 |
| 2005/0016721 | A1 * | 1/2005 | Antonijevic | F28D 7/0008 165/177 |
| 2005/0028529 | A1 * | 2/2005 | Bartlett | B01D 53/1475 60/772 |
| 2005/0067153 | A1 * | 3/2005 | Wu | F28F 9/0221 165/158 |
| 2005/0217836 | A1 * | 10/2005 | Whittenberger | F28D 9/0037 165/165 |
| 2008/0163644 | A1 * | 7/2008 | Kadle | F25B 9/008 62/513 |
| 2008/0173434 | A1 * | 7/2008 | Matter | F28F 1/022 165/150 |
| 2008/0236792 | A1 * | 10/2008 | Mast | F28D 7/1684 165/157 |
| 2009/0025916 | A1 * | 1/2009 | Meshenky | F28D 9/0037 165/151 |
| 2009/0158739 | A1 * | 6/2009 | Messmer | F02C 7/1435 60/648 |
| 2009/0250201 | A1 * | 10/2009 | Grippe | F28F 3/025 165/164 |
| 2010/0024421 | A1 * | 2/2010 | Litwin | F02C 1/05 60/641.8 |
| 2010/0150713 | A1 * | 6/2010 | Stankovic | F02C 3/14 415/220 |
| 2010/0186934 | A1 * | 7/2010 | Bellenfant | F28D 1/0408 165/164 |
| 2012/0039701 | A1 * | 2/2012 | Diddi | F02C 1/10 415/1 |
| 2013/0152576 | A1 * | 6/2013 | Mavuri | F01K 7/32 60/508 |
| 2013/0264031 | A1 | 10/2013 | Plourde et al. | |
| 2014/0174703 | A1 * | 6/2014 | Yoshioka | F28F 9/0278 165/173 |
| 2014/0338878 | A1 * | 11/2014 | Tessnow | F21V 29/76 165/185 |
| 2015/0298267 | A1 * | 10/2015 | Rigal | B23K 26/244 29/890.03 |
| 2016/0195336 | A1 | 7/2016 | Veilleux, Jr. et al. | |

(56) References Cited

U.S. PATENT DOCUMENTS

2016/0223263 A1* 8/2016 Emrich ................. F28F 9/0219
2017/0335689 A1* 11/2017 Golan .................... F02C 7/185

FOREIGN PATENT DOCUMENTS

KR            1464889 B1 * 11/2014 ........... F28D 7/0025
KR           101464889 B1 * 11/2014 ........... F28D 7/0025

OTHER PUBLICATIONS

KR-1464889-B1_English_machine_translation (Year: 2014).*
International Search Report of the International Searching Authority for PCT/US2017/037059 dated Feb. 9, 2018.

* cited by examiner

COUNTER-FLOW HEAT EXCHANGER

BACKGROUND

The present application relates generally to heat exchangers and more particularly relates to a counter-flow heat exchanger with improved thermal and pressure resistance.

Heat exchanging systems, employing heat exchangers, are widely used in applications such as space heating, refrigeration, air conditioning, power plants, chemical processing plants and numerous engines, machines, vehicles and electrical devices. Heat exchangers may be employed in these various applications for efficient heat transfer from one medium to another, and more particularly to exchange heat between two fluids. For example, a first fluid at a higher temperature may be passed through one or more first channels or passageways, while a second fluid at a lower temperature may be passed through one or more second channels or passageways. The first and second passageways may be in contact or close proximity, allowing heat from the first fluid to be passed to the second fluid. Thus, the temperature of the first fluid may be decreased and the temperature of the second fluid may be increased.

In general, heat exchangers may be classified according to their flow configuration as crossflow heat exchanging systems, parallel heat exchanging systems, counter-flow heat exchanging systems, or in terms of their geometry and design as shell and tube heat exchangers, plate heat exchangers, and finned tube heat exchangers, among many others.

One of the main design goals in the construction of heat exchangers focuses on maximizing heat transfer while minimizing the pressure loss therethrough. Generally described, the extent of the pressure loss and heat transfer factors into the operating costs and the overall energy losses and efficiency of the heat exchanger and its use. Accordingly, in heat exchange applications it is advantageous to utilize a design with a low-pressure loss and a relatively high heat transfer. Of particular concern here are single-pass counter-flow heat exchangers employing multiple capillary tube rows or similar heat exchanging passageways, such as the type commercially available and suitable for use in heat exchange applications. The heat exchanging passageways are thermally connected in a core area of the heat exchanger, with one set of heat exchanging passageways extending beyond the other set of heat exchanging passageways on both sides of the heat exchanger. The longer passageways extend through a tube plate which separates a plenum of one fluid side to the other fluid side. A shell typically surrounds the plenums to contain the pressure.

Of concern herein are two issues that emerge when designing a heat exchanger with multiple parallel rows of heat exchanging passageways in a single-pass counter-flow arrangement e.g. for a superheater or reheater section in a heat recovery steam generator (HRSG), an air-cooled condenser, for a gas turbine (GT) recuperator, and in particular for supercritical $CO_2$ power cycles. One such issue relates to the fabrication costs and complexity of the heat exchanger, and more particularly, a desire to reduce the cost and difficulty in typical manufacturing methods that require drilling, or the like, for each individual heat exchange passageway and the positioning of each individual heat exchange passageway within a respective drilled opening in the tube plate. Another issue relates to the maintaining temperature and pressure requirements while achieving such reduction in fabrication costs and complexity Accordingly, there is a desire for an improved single-pass counter-flow heat exchanger, and in particular a recuperator, that provides for ease in manufacture, while reducing manufacturing costs and maintaining robustness as to holding temperature and pressure. Such a heat exchanger preferably may be used for a variety of gas to gas, gas to liquid or gas to steam heat transfer applications and specifically may be used for steam superheaters, steam reheaters, gas turbine recuperators or air-cooled condensers in power plants.

BRIEF DESCRIPTION

The present application is directed to an embodiment of a heat exchanger for exchanging heat between two fluid flows in counter-flow arrangement and having improved temperature and pressure resistance. The heat exchanger may include a core region and a plenum region. The core region having opposed distal ends and defining a length therebetween. The core region including a first set of heat exchanging passageways disposed at least partially therein the core region and a second set of heat exchanging passageways disposed at least partially therein the core region. The plenum region is disposed adjacent the opposed distal ends of the core region. Each plenum region including a fluid inlet plenum, a fluid outlet plenum and a tube plate disposed therebetween the fluid inlet plenum and the fluid outlet plenum. The first set of heat exchanging passageways defining a first tube-side fluid flow path in a first direction for a first fluid and the second set of heat exchanging passageways defining a second tube-side fluid flow path in a second opposing direction for a second fluid. The second set of heat exchange passageways having a length greater than the first set of heat exchange passageways. Each of the heat exchanging passageways of the first set of heat exchanging passageways and the second set of heat exchanging passageways extending from one of the fluid inlet plenums to one of the fluid outlet plenums. The tube plates and the core region include one of a cast metal formed thereabout each of the heat exchanging passageways of the first set of heat exchanging passageways and the second set of heat exchanging passageways or a braze bond formed between each of the heat exchanging passageways of the first set of heat exchanging passageways and the second set of heat exchanging passageways.

Another embodiment of the present application is directed to a heat exchanger for exchanging heat between two fluid flows in counter-flow arrangement. The heat exchanger may include a core region, a first set of heat exchanging passageways and a second set of heat exchanging passageways, a first fluid inlet plenum, a first fluid outlet plenum, a second fluid inlet plenum, a second fluid outlet plenum and a tube plate disposed between the second fluid outlet plenum and the first fluid inlet plenum and a tube plate disposed between the first fluid outlet plenum and the second fluid inlet plenum. The core region having a first end, a second end and defining a length therebetween. The first set of heat exchanging passageways and the second set of heat exchanging passageways disposed at least partially therein the core region. The first fluid inlet plenum disposed adjacent the first end of the core region and the first fluid outlet plenum disposed adjacent the second end of the core region. The second fluid inlet plenum disposed adjacent the first fluid outlet plenum and the second fluid outlet plenum disposed adjacent the first fluid inlet plenum. The first set of heat exchanging passageways defining a first tube-side fluid flow path in a first direction for a first fluid. The first set of heat exchanging passageways extending from the first fluid inlet plenum to the first fluid outlet plenum. The second set of heat exchanging passageways defining a second tube-side fluid flow path in a second direction for a second fluid. The second set of heat exchanging passageways extending from the second fluid inlet plenum to the second fluid outlet plenum, and wherein the first direction is opposed to the second direction. The tube plates and the core region including one of a cast metal formed thereabout the first set of heat exchanging passageways and the second set of heat exchanging passageways or a braze bond formed thereabout the first set of heat exchanging passageways and the second set of heat exchanging passageways.

The present application further provides a method of fabricating a heat exchanger for exchanging heat between two fluid flows in counter-flow arrangement. The method may include one of casting or brazing a first set of heat exchanging passageways and a second set of heat exchanging passageways to form a core region, one of casting or brazing a tube plate about opposed distal ends of each heat exchanging passageway of the second set of heat exchanging passageways to define a plenum region adjacent the opposed distal ends of the core region and disposing a core shell about the core region and a plenum shell about each of the plenum regions. The core region having opposed distal ends and defining a length therebetween. The first set of heat exchanging passageways truncated proximate the opposed distal ends of the core region and the second set of heat exchanging passageways extending a length greater than a length of the first set of heat exchanging passageways. Each of plenum regions including a fluid inlet plenum and a fluid outlet plenum the tube plate disposed therebetween the fluid inlet plenum and the fluid outlet plenum.

These and other features and improvements of the present application will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

As discussed in detail below, embodiments of the present invention include an improved heat exchanging system that discloses a plurality of heat exchanging passageways arranged for improved temperature and pressure resistance and a method of manufacture.

Generally, relevant heat exchanging systems are widely used in applications that either emit a significant volume of waste exhaust fluids at high temperatures or cool a large volume flow of gas or vapor using air. Non-limiting examples of such applications include chemical processing plants, power plants and specifically gas turbine engines and air coolers. The heat exchanging systems are incorporated in some of these applications to recover heat from the waste exhaust fluids. These heat exchanging systems recover heat from the waste exhaust fluids via a process of heat transfer. The heat transfer is a physical phenomenon that facilitates heat exchange between fluids at different temperatures through a conducting wall. The heat exchanging systems work on the phenomena of heat transfer to recover heat from the waste exhaust fluids. The heat exchanging systems have different modes of operation based on the design of the heat exchanging systems. The heat exchanging systems are typically classified according to the operation of the heat exchanging system. Fluids flow within enclosed surfaces in the heat exchanging systems, with the enclosed surfaces providing direction and flow path to the fluids.

Figure 1:
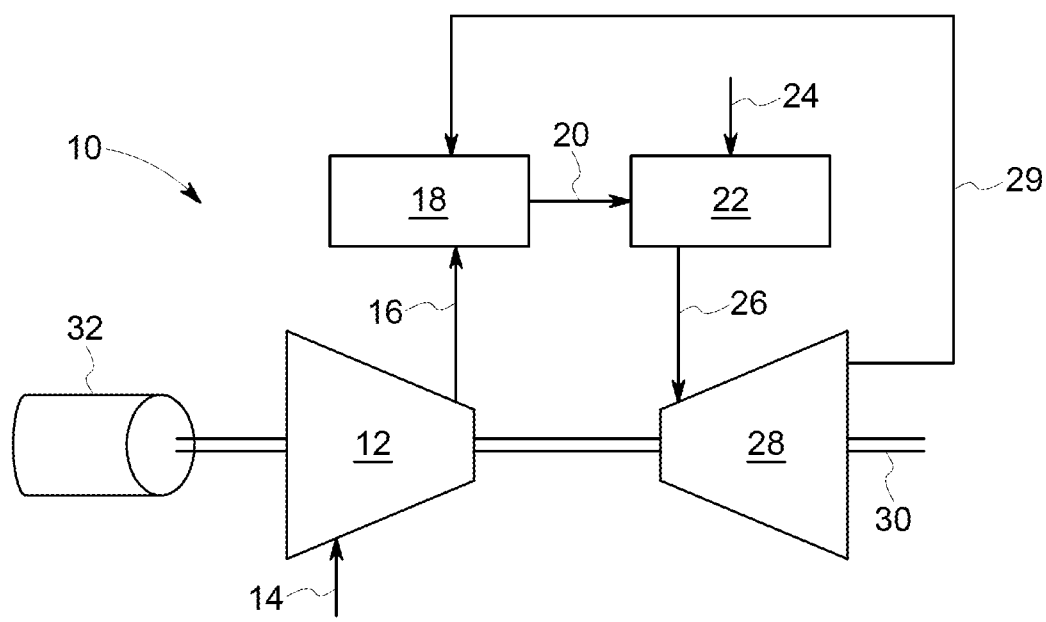
FIG. 1 is a schematic view of a gas turbine engine including a heat exchanger, in accordance with one or more embodiments shown or described herein.

Referring now to the drawings, it is noted that like numerals refer to like elements throughout the several views and that the elements shown in the Figures are not drawn to scale and no dimensions should be inferred from relative sizes and distances illustrated in the Figures. Illustrated in FIG. 1 is a schematic view of a gas turbine engine 10 as may be described herein. The gas turbine engine 10 may include a compressor 12. The compressor 12 compresses an incoming flow of air 14. The compressor 12 delivers a compressed flow of air 16 to a gas turbine recuperator 18. The recuperator 18 utilizes heat from downstream of the combustion process to heat the compressed flow of air 16. In the illustrated embodiment, the recuperator utilizes heat from a turbine exhaust stream 29. Anywhere downstream of the combustor is a possible source. Other possible sources to heat the compressed flow of air 16 depend on the available temperature, and include other waste heat—such as oil from bearings or other sources on inefficiencies. It is noted that alternate arrangements for recuperation may benefit from the invention.

The gas turbine recuperator 18 delivers a cooled, compressed flow of air 20 to a combustor 22. The combustor 22 mixes the compressed flow of air 20 with a compressed flow of fuel 24 and ignites the mixture to create a flow of combustion gases 26. Although only a single combustor 22 is shown, the gas turbine engine 10 may include any number of combustors 22.

The flow of combustion gases 26 is in turn delivered to a turbine 28. The flow of combustion gases 26 drives the turbine 28 so as to produce mechanical work via the turning of a turbine shaft 30. The mechanical work produced in the turbine 28 drives the compressor 12 and an external load such as an electrical generator 32 and the like via the turbine shaft 30. In an alternate embodiment, the mechanical work produced by the turbine 28 may be turned into propulsive power via exhausting a fluid from the gas turbine.

The gas turbine engine 10 may use natural gas, various types of petroleum-based liquid fuels, synthesis gas, and other types of fuels. The gas turbine engine 10 may be any number of different turbines offered by General Electric Company of Schenectady, New York or otherwise. The gas turbine engine 10 may have other configurations and may use other types of components. Other types of gas turbine engines also may be used herein. Multiple gas turbine engines 10, other types of turbines, and other types of power generation equipment may be used herein together.

Generally described, the gas turbine recuperator 18 may be a heat exchanger, such as disclosed herein, being disposed in a large duct with fluid flow passageways interposed therein such that the compressed flow of air 20 is cooled as it passes through the duct.

Figure 2:
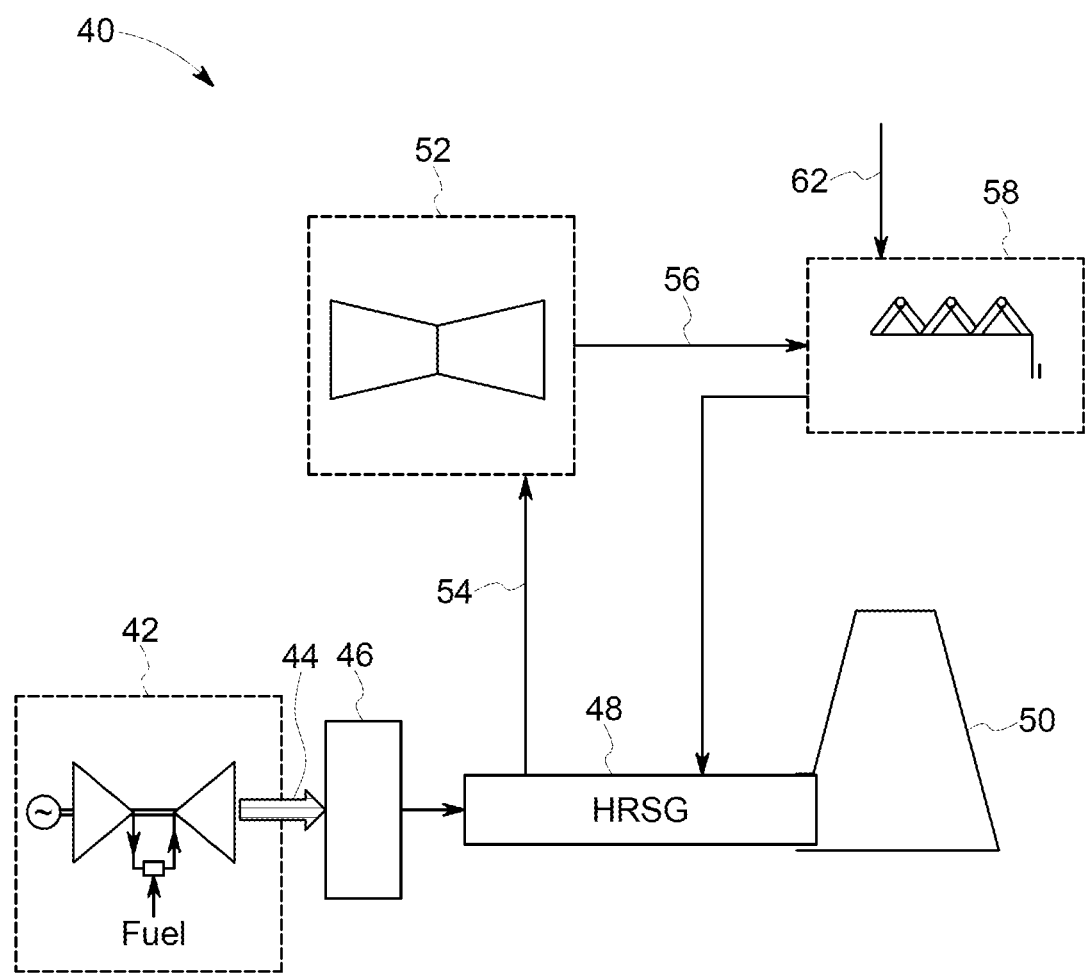
FIG. 2 is a schematic view of a system for use in a power plant including a heat exchanger, in accordance with one or more embodiments shown or described herein.

FIG. 2 shows a schematic view of a system 40 for use in a power plant, such as a combined cycle power plant as may be described herein. For certain combined cycle power plants or in chemical processing plants, to be used in water scarce regions of the world, an air-cooled condenser or air coolers for process or working fluids may be installed due to the unavailability of water. The power plant includes an energy source, such as a gas turbine 42, which generates heat 44 during operations thereof, a recuperator 46, which is coupled to the gas turbine 42, a heat recovery steam generator (HRSG) 48, which is coupled to the recuperator 46, a cooling tower 50 and one or more steam turbines 52. The HRSG 48 generates steam 54 by way of the heat generated by the gas turbine 42 and includes heat exchangers, such as super heaters, evaporators, and pre-heaters, which are disposed along an axis thereof, and by which portions of the generated steam 54 are diverted to the one or more steam turbines 52 to generate power, such as electricity, by way of the diverted steam, and output a spent steam supply 56. An air-cooled condenser 58 is configured to fluidly receive and air-cool the spent steam supply 56. The air-cooled condenser 58 operates with electrically driven fans and cools the spent steam supply 56 via a supply of air 62.

Generally described, the recuperator 46 may be a heat exchanger, such as disclosed herein. It is noted that the power plant shown in FIG. 2 is merely exemplary and that other configurations of the same are possible.

Figure 3:
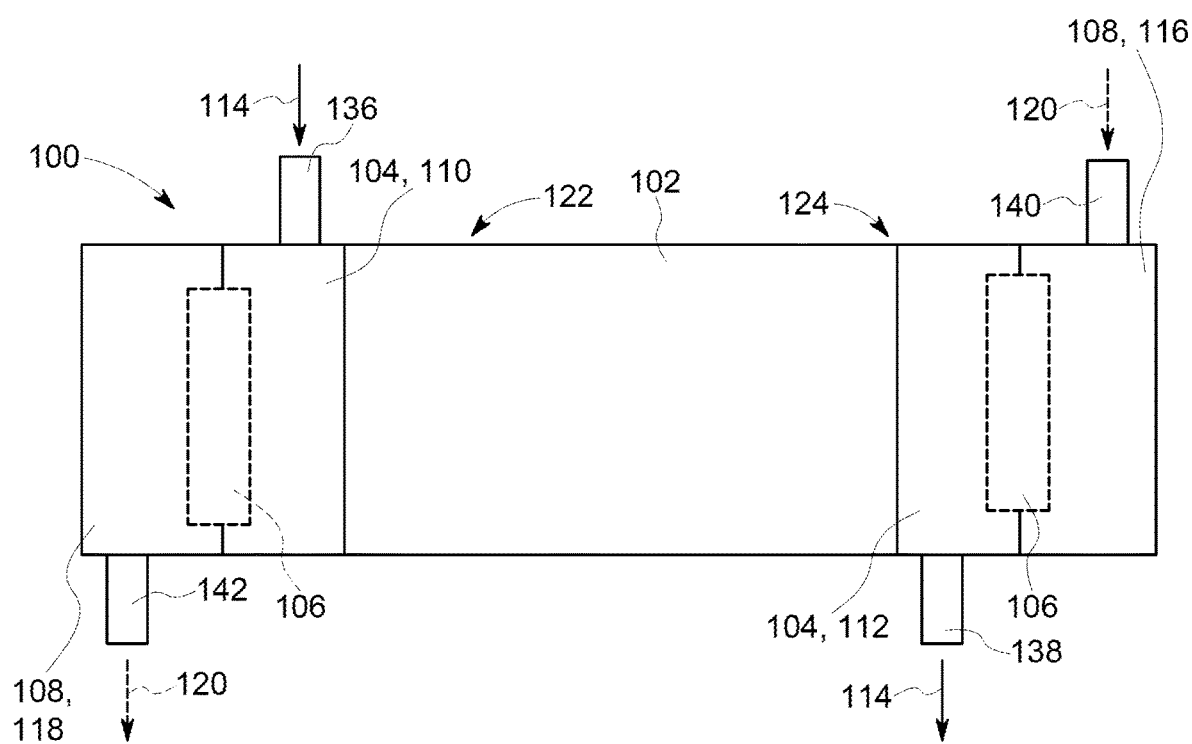
FIG. 3 is a schematic view illustrating the zones of a heat exchanger, in accordance with one or more embodiments shown or described herein.
Figure 4:
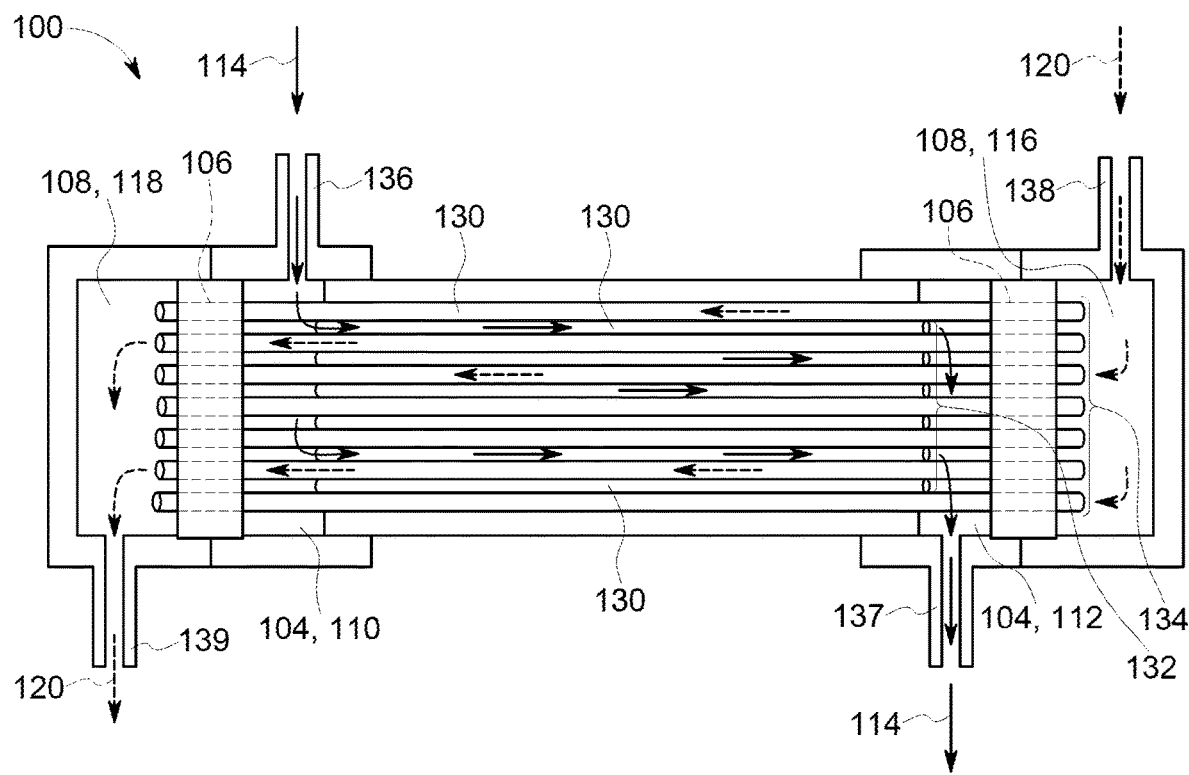
FIG. 4 is a schematic view of a tube-matrix heat exchanger, in accordance with one or more embodiments shown or described herein.

Referring now to FIGS. 3 and 4, illustrated schematically is a heat exchanger 100 according to an embodiment as may be described herein. More particularly, schematically illustrated in FIG. 3 is the heat exchanger 100 showing a plurality of zones, in accordance with one or more embodiments shown or described herein. FIG. 4 illustrated a schematic cross-sectional view of the heat exchanger 100, in accordance with one or more embodiments shown or described herein. The heat exchanger 100 may be used as the recuperator 18 of FIG. 1 or the recuperator 46 of FIG. 2, or for any type of heat exchange device or purpose.

Referring again to FIG. 3, in the illustrated embodiment the heat exchanger 100 includes four general regions or zones. The heat exchanger 100 includes a central core region 102, inner plenum regions 104, tube plate regions 106 and outer plenum regions 108. In an embodiment, the heat exchanger 100 is symmetrically configured about the central core region 102. The inner plenum regions 104 comprise a first fluid inlet plenum 110 and a first fluid outlet plenum 112. The first fluid inlet plenum 110 and the first fluid outlet plenum 112 provide for the input and output, respectively, of a first fluid 114. Each of the outer plenum regions 108 comprise a second fluid inlet plenum 116 and a second fluid outlet plenum 118, for the input/output of a second fluid 120. In the illustrated embodiment, the first fluid inlet plenum 110 and the second fluid outlet plenum 118 are positioned proximate a first end 122 of the core region, and having a tube plate 106 disposed therebetween the first fluid inlet plenum 110 and the second fluid outlet plenum 118. The first fluid outlet plenum 112 and the second fluid inlet plenum 116 are positioned proximate an opposed second end 124 of the core region 102, and having a tube plate 106 disposed therebetween the first fluid outlet plenum 112 and the second fluid inlet plenum 116.

Referring now to FIG. 4, illustrated is a schematic cross-sectional view of the heat exchanger 100. The heat exchanger 100 includes two sets of heat exchanging passageways 130, arranged interspersed between each other. In an embodiment, the heat exchanging passageways 130 may be referred to as capillary-sized tubes. In the illustrated embodiment, the heat exchanger 100 includes a first set 132 of heat exchanging passageways 130 and a second set 134 of heat exchanging passageways 130, disposed in the core region 102 in a counter-flow configuration. In the illustrated embodiment, the heat exchanging passageways 130 are configured having a generally tubular structure, and may additionally be referred to herein as heat exchanging tubes. In alternate embodiments, the heat exchanging passageways 130 may include other structural geometries, such as those described presently.

The first set 132 of heat exchanging passageways 130 define a fluid flow path in a first direction, as indicated by solid directional arrows, for the first fluid 114. The second set 134 of heat exchanging passageways 130 define a fluid flow path in a second direction, as indicated by dashed directional arrows, for the second fluid 120. In an embodiment, the first fluid 114 is a hot side fluid and the second fluid 120 is a cold side fluid. In another embodiment, the first fluid 114 is the cold side fluid and the second fluid 120 is the hot side fluid.

As best illustrated in FIG. 4, the first set 132 of heat exchanging passageways 130 carrying the first fluid 114 therein truncate in the inner plenum area 104 on each side of the core region 102. More particularly, the first set 132 of heat exchanging passageways 130 extend from the first fluid inlet plenum 110, through the core region 102, truncating in the first fluid outlet plenum 112. The second set 134 of heat exchanging passageways 130 carrying the second fluid 120 therein truncate in the outer plenum areas 108 on each side of the respective tube plate 106. More particularly, the second set 134 of heat exchanging passageways 130 extend from the second fluid inlet plenum 116, into and through the tube plates 106, truncating in the second fluid outlet plenum 118. The relative positions, and axial lengths, of the inner and outer fluid plenums 104, 108, as illustrated, are nominal and will be determined by available flow area/pressure drop trades as well as structural considerations for the passageway connections.

During operation, the first fluid 114 is input at an inlet 136 into the first fluid inlet plenum 110. The first fluid 114 flows through the first set 132 of heat exchanging passageways 130 and into the first fluid outlet plenum 112, as indicated by directional arrows. The first fluid 114 is output from the first fluid outlet plenum 112 at an outlet 137. Simultaneously, the second fluid 120 is input at an inlet 138 into the second fluid inlet plenum 116. The second fluid 120 flows through the second set 134 of heat exchanging passageways 130 and into the second fluid outlet plenum 118, as indicated by directional arrows. The second fluid 120 is output from the second fluid outlet plenum 118 at an outlet 139.

Referring now to FIGS. 5-8, illustrated are various examples of nominal core heat exchange passageway arrangements, for use in the heat exchanger 100 of FIGS. 3 and 4. A first side fluid heat exchange passageway, similar to the first set 132 of heat exchanging passageways 130 of FIG. 4, is indicated in solid shading throughout FIGS. 5-8. A second side fluid heat exchange passageway, similar to the second set 134 of heat exchanging passageways 130 of FIG. 4, is indicated in stippled shading throughout FIGS. 5-8. As illustrated, in the embodiments, each heat exchange passageway 130 is configured having sufficient thermal contact area between itself and an adjacent heat exchange passageway 130 carrying the opposing temperature fluid.

Figure 5:
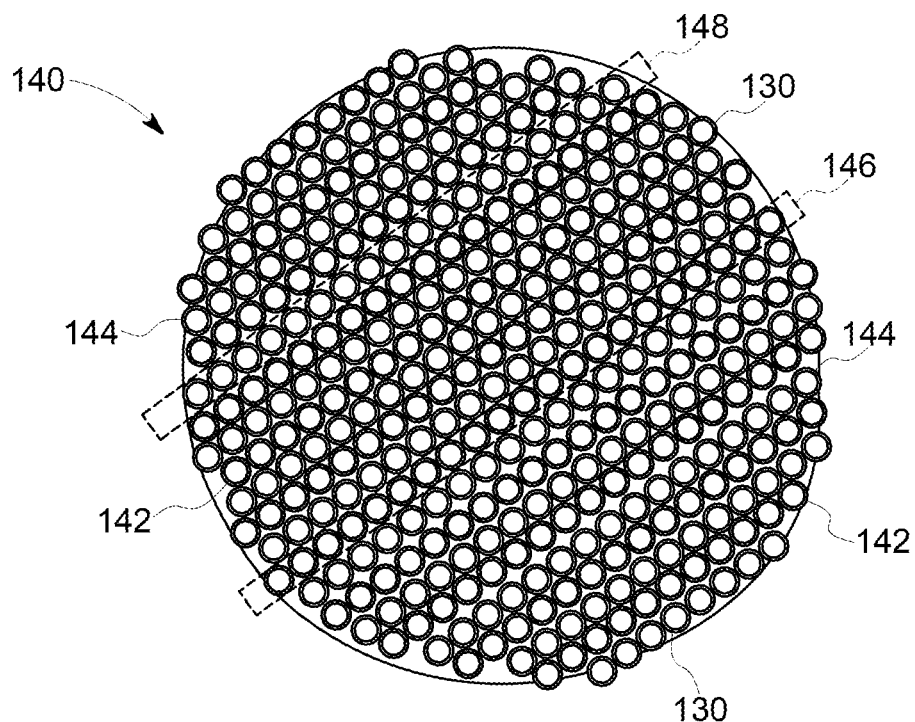
FIG. 5 is a schematic view of an embodiment of a nominal core tube arrangement and tube shapes for use in the heat exchanger of FIG. 3, in accordance with one or more embodiments shown or described herein.

Referring more specifically to FIG. 5, illustrated is an embodiment of the heat exchanging passageways 130 of FIGS. 3 and 4, generally referenced 140. In this particular embodiment, the heat exchanging passageways 130 comprise a first set 142 of heat exchanging passageways 130 and a second set 144 of heat exchanging passageways 130, generally similar to first set 132 and second set 134 of FIG. 4, disposed in the core region 102 (FIG. 3) in a counter-flow configuration. In the illustrated embodiment, the heat exchanging passageways 130 are configured having a generally cylindrical structure, and may be referred to herein as heat exchanging tubes. The first set 142 of heat exchanging passageways 130 define a fluid flow path in a first direction for the first fluid 114. The second set 144 of heat exchanging passageways 130 define a fluid flow path in a second direction for the second fluid 120. As previously indicated, in an embodiment the first fluid 114 is a hot side fluid and the second fluid 120 is a cold side fluid. In another embodiment, the first fluid 114 is the cold side fluid and the second fluid 120 is the hot side fluid. As illustrated, the first set 142 of heat exchanging passageways 130 are arranged in a plurality of rows 146, of which a single row is indicated by dashed line, and the second set 144 of heat exchanging passageways 130 are arranged in a plurality of rows 148, of which a single row is indicated by dashed line, with the rows 146, 148 arranged in an alternating arrangement. Such arrangement provides sufficient thermal contact area between each heat exchanging passageway 130 in the first set 142 with an adjacent heat exchange passageway 130 in the second set 144 and carrying an opposing temperature fluid.

Figure 6:
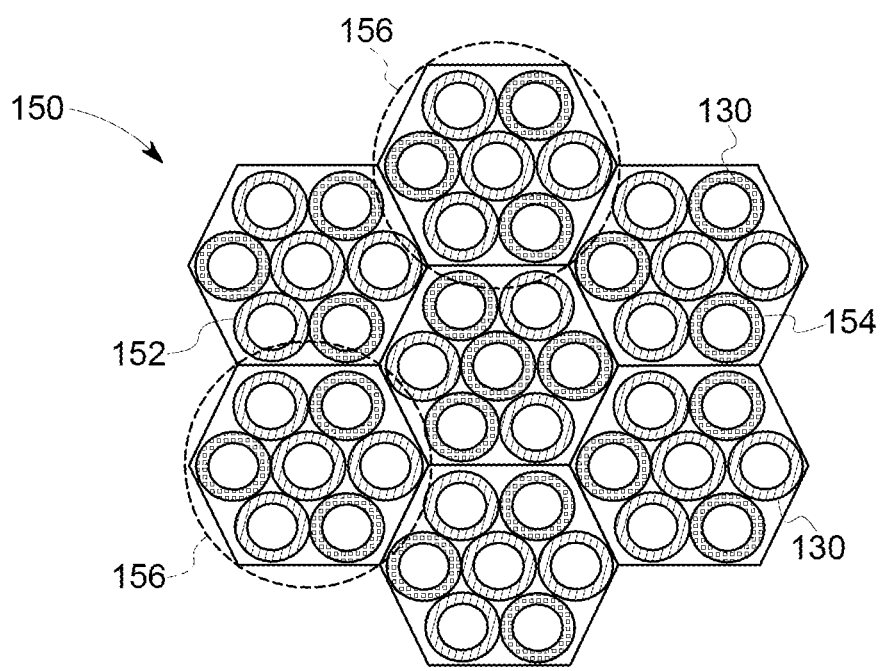
FIG. 6 is a schematic view of another embodiment of a nominal core tube arrangement and tube shapes for use in the heat exchanger of FIG. 3, in accordance with one or more embodiments shown or described herein.

Referring now to FIG. 6, illustrated is another embodiment of the heat exchanging passageways 130 of FIGS. 3 and 4, generally referenced 150. In this particular embodiment, the heat exchanging passageways 130 comprise a first set 152 of heat exchanging passageways 130 and a second set 154 of heat exchanging passageways 130, generally similar to first set 132 and second set 134 of FIG. 4, disposed in the core region 102 (FIG. 3) in a counter-flow configuration. In the illustrated embodiment, the individual heat exchanging passageways 130 are configured having a generally cylindrical structure. The first set 152 of heat exchanging passageways 130 define a fluid flow path in a first direction for the first fluid 114. The second set 152 of heat exchanging passageways 130 define a fluid flow path in a second direction for the second fluid 120. As previously indicated, in an embodiment the first fluid 114 is a hot side fluid and the second fluid 120 is a cold side fluid. In another embodiment, the first fluid 114 is the cold side fluid and the second fluid 120 is the hot side fluid. As illustrated, heat exchanging passageways 130 are grouped into a plurality of bundles 156, as indicated by dotted line. In the illustrated embodiment, each of the bundles 156 is generally hexagonal in overall shape, although any geometric shaping of the bundles is anticipated. Such arrangement provides sufficient thermal contact area between each heat exchanging passageway 130 in the first set 152 with an adjacent heat exchange passageway 130 in the second set 152 and carrying an opposing temperature fluid.

Figure 7:
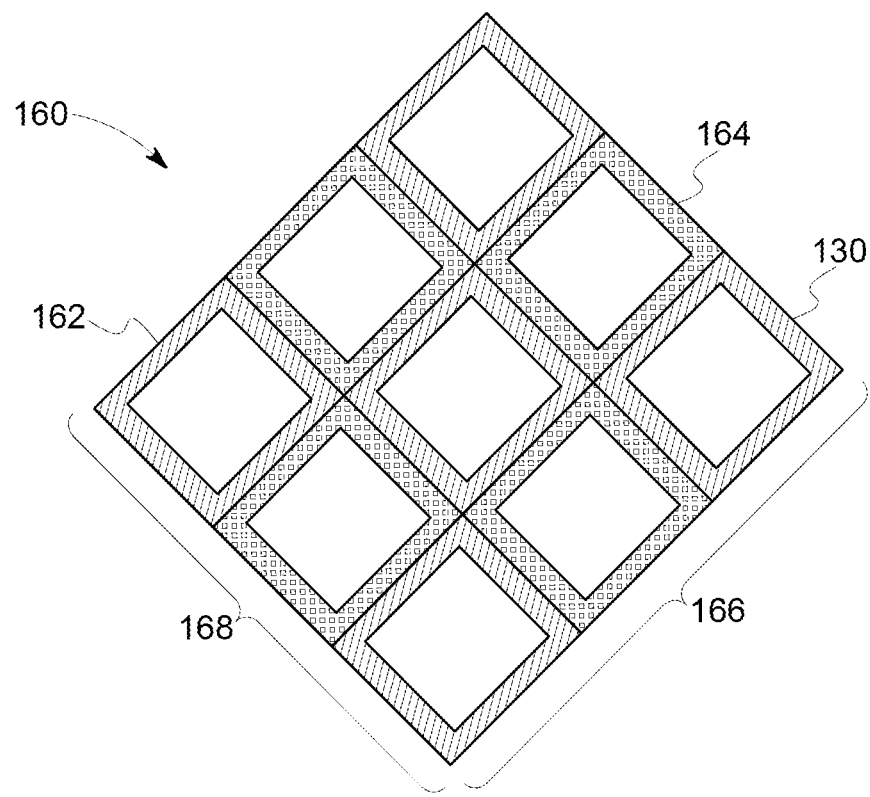
FIG. 7 is a schematic view of another embodiment of a nominal core tube arrangement and tube shapes for use in the heat exchanger of FIG. 3, in accordance with one or more embodiments shown or described herein.

Referring more specifically to FIG. 7, illustrated is another embodiment of the heat exchanging passageways 130 of FIGS. 3 and 4, generally referenced 160. In this particular embodiment, the heat exchanging passageways 130 comprise a first set 162 of heat exchanging passageways 130 and a second set 164 of heat exchanging passageways 130, generally similar to first set 132 and second set 134 of FIG. 4, disposed in the core region 102 (FIG. 3) in a counter-flow configuration. The heat exchanging passageways 130 are configured having a generally polygon shape and may be referred to herein as heat exchanging tubes. In the illustrated embodiment, the heat exchanging tubes 130 are configured as quadrilateral shaped structure. In another embodiment, the heat exchanging tubes 130 may be triangular, rectangular, hexagonal (as described presently), or any similar polygon shaped structure that allows for sufficient thermal contact area between each heat exchanging passageway 130. The first set 162 of heat exchanging passageways 130 define a fluid flow path in a first direction for the first fluid 114. The second set 164 of heat exchanging passageways 130 define a fluid flow path in a second direction for the second fluid 120. As previously indicated, in an embodiment the first fluid 114 is a hot side fluid and the second fluid 120 is a cold side fluid. In another embodiment, the first fluid 114 is the cold side fluid and the second fluid 120 is the hot side fluid. As illustrated, the heat exchanging passageways 130 are arranged in a plurality of rows 166 and columns 168 with adjacent heat exchanging passageways 130 arranged in an alternating counter-flow arrangement. Such arrangement provides sufficient thermal contact area between each heat exchanging passageway 130 in the first set 162 with an adjacent heat exchange passageway 130 in the second set 164 and carrying an opposing temperature fluid.

Figure 8:
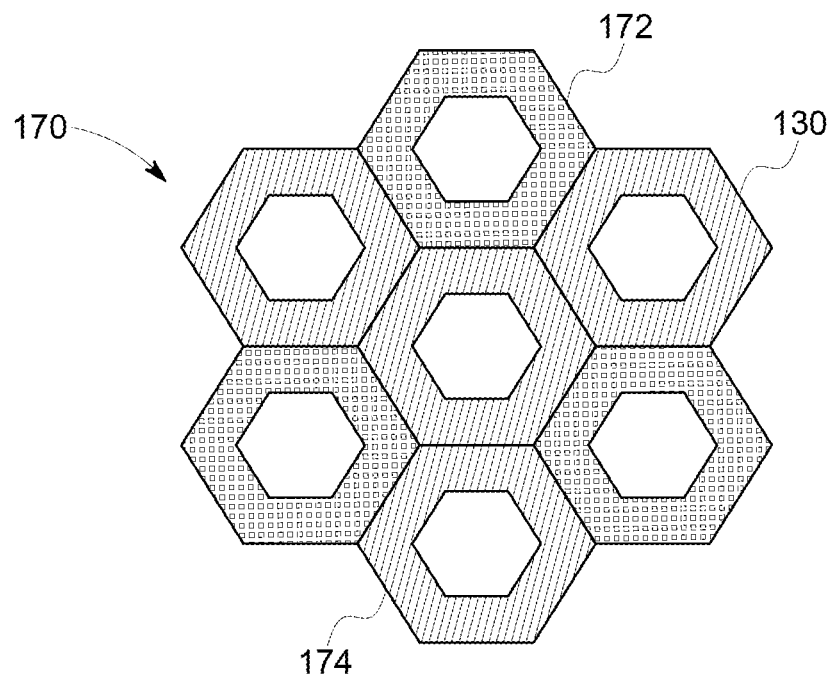
FIG. 8 is a schematic view of another embodiment of a nominal core tube arrangement and tube shapes for use in the heat exchanger of FIG. 3, in accordance with one or more embodiments shown or described herein.

Referring now to FIG. 8, illustrated is an embodiment of the heat exchanging passageways 130 of FIGS. 3 and 4, generally referenced 170. In this particular embodiment, the heat exchanging passageways 130 comprise a first set 172 of heat exchanging passageways 130 and a second set 174 of heat exchanging passageways 130, generally similar to first set 132 and second set 134 of FIG. 4, disposed in the core region 102 (FIG. 3) in a counter-flow configuration. Similar to the embodiment of FIG. 7, the heat exchanging passageways 130 are configured having a generally polygon shape and may be referred to herein as heat exchanging tubes. In the illustrated embodiment, the heat exchanging passageways 130 are configured having a generally hexagonal shape, but as previously noted, the heat exchanging passageways 130 may have any polygon shaped structure that allows for sufficient thermal contact area between each heat exchanging passageway 130. The first set 172 of heat exchanging passageways 130 define a fluid flow path in a first direction for the first fluid 114. The second set 174 of heat exchanging passageways 130 define a fluid flow path in a second direction for the second fluid 120, as previously described. As illustrated, the heat exchanging passageways 130 are arranged in an alternating counter-flow arrangement. Such arrangement provides sufficient thermal contact area between each heat exchanging passageway 130 in the first set 172 with an adjacent heat exchange passageway 130 in the second set 174 and carrying an opposing temperature fluid.

In the embodiments of FIGS. 4-8, preliminary calculations indicate each individual heat exchanging passageway 130 having an outer diameter in a range of 0.5-2 mm, with a wall thickness in a range of 0.1-0.5 mm, with the core length in a range of 10-2000 mm. The number of heat exchanging passageway 130 required for each fluid side is estimated to be in the range of 1.1 to $1.4 \times 10^6$. This results in an estimated diameter of the core region 102 on the order of 0.1-1.5 m. The optimal value for the various parameters will be determined by trade-offs between heat transfer capability, fluid pressure drop, stress resulting from pressure, thermal gradients and transient behavior, manufacturability, and cost.

Figure 9:
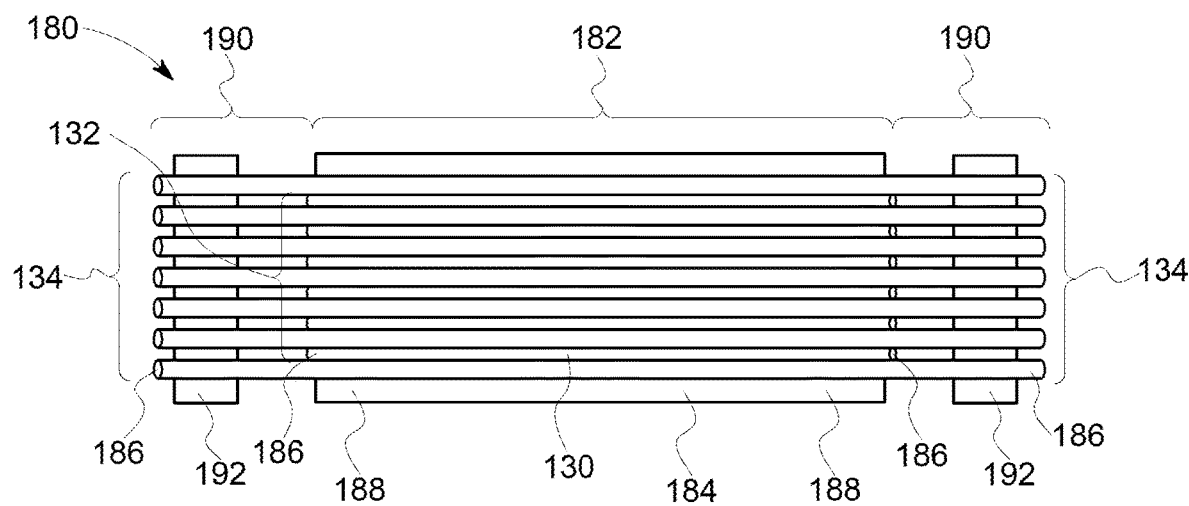
FIG. 9 is a schematic view of a plurality of heat exchange passageway disposed in casting molds during manufacture of the heat exchanger of FIG. 3, in accordance with one or more embodiments shown or described herein.
Figure 10:
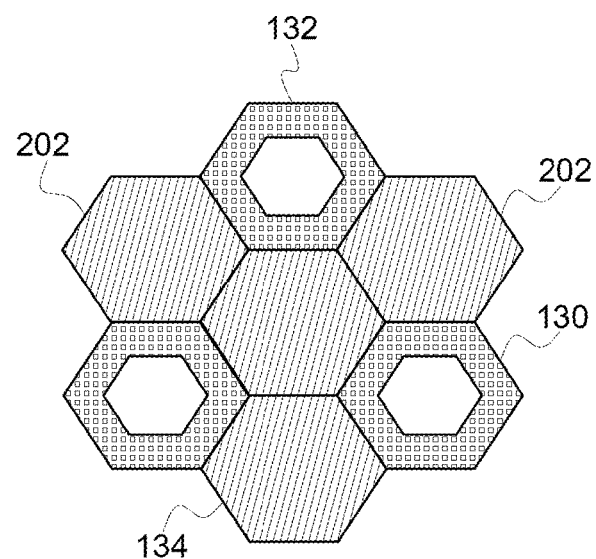
FIG. 10 is a schematic end view of an end portion of a nominal tube arrangement and tube shapes for use in the heat exchanger of FIG. 3, in accordance with one or more embodiments shown or described herein.
Figure 11:
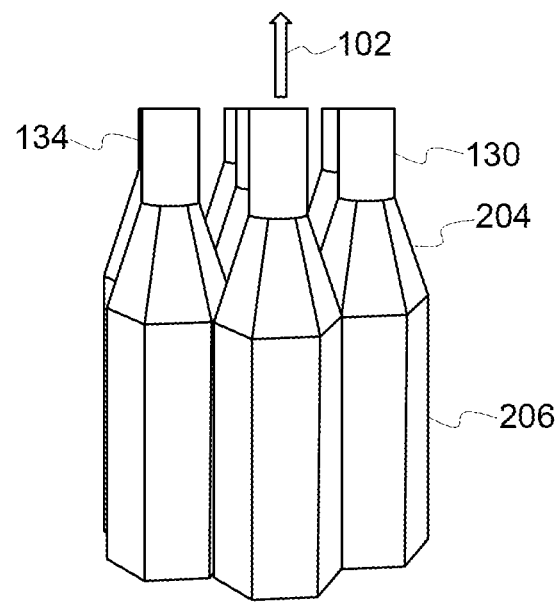
FIG. 11 is an isometric view of an end portion of a nominal tube arrangement and tube shapes for use in the heat exchanger of FIG. 3, in accordance with one or more embodiments shown or described herein.

Referring now to FIGS. 9-11, two manufacturing methods for the central core region 102 and the plurality of tube plates 106 will be disclosed herein. More particularly, in a first disclosed method 180, casting the central core region 102 and the plurality of tube plates 106 is described. During the casting process the central core region 102 requires arranging and securing a middle length 182, or central portion, of the plurality of heat exchanging passageways 130 within a casting mold 184. More specifically, each of the heat exchanging passageways 130 is positioned with its distal ends 186 protruding from the axial mold ends 188 of the casting mold 184. As illustrated, at least one set of heat exchanging passageways 130, and more particularly the second set 134 of heat exchanging passageways 130, as previously defined, will extend a length 190 at each distal end 186 beyond the first set 132 of heat exchanging passageways 130. The second set 134 of heat exchanging passageways 130, extending the length 190 beyond the first set 132 of heat exchanging passageways 130, are secured within a tube plate casting mold 192. It is noted during the casting process, the cast metal is controlled in such a manner to prevent blocking of the plurality of flow passages defined within each set 132, 134 of heat exchanging passageways 130.

In an embodiment, the cast metal formed about the plurality of heat exchanging passageways 130 to form the core region 102 and the tube plate 106 will have a melt temperature lower than material of the heat exchanging passageways 130. Numerous low-cost metal alloys are available for the cast metal. In an exemplary embodiment, the range of melt points for 17-4 PH type stainless steel and 304 type stainless steel is 25 to 75° C. greater than that for 316 stainless steel. Cast alloys other than steel, with an even larger melt point temperatures may also be used during the first disclosed method 180, and more particularly the casting process. In addition to manufacturability, other considerations during the manufacture process include thermal conductivity, coefficient of thermal expansion, strength and workability related modulus values, and cost.

In a second disclosed method of manufacture, brazing to form the central core region 102 and the plurality of tube plates 106 is described. For the purposes of this disclosure, diffusion bonding is included as a brazing process. In the central core region 102, the brazing process requires a tight packing of the heat exchanging passageways 130 and the applied temperature and pressure. A brazing filler metal may or may not be required. The shape of the heat exchanging passageways 130, such as those previously described with regard to FIGS. 7 and 8, and more particularly, quadrilateral or hexagonal, may be advantageous to the core brazing process. The process proceeds with increasing the core temperature under high pressure.

Brazing the heat exchanging passageways 130 requires additional consideration. During manufacture, the first set 132 of heat exchanging passageways 130, and more particularly the longer length heat exchanging passageways 130, will be cantilevered beyond the central core region 102 and the plurality of tube plates 106 must be able to withstand the pressure difference between the first fluid inlet plenum 110 and the second fluid outlet plenum 118 and between the second fluid inlet plenum 116 and the first fluid outlet plenum 112, while also securing the heat exchanging passageways 130. Referring now to FIG. 10, in a region whereby the first set 132 of heat exchanging passageways 120 have been truncated, a solid rod 202 is substituted for the volume otherwise taken by the heat exchange passageway 130 carrying the other fluid in the central core region 102. This allows the brazing processes to proceed similar to that in the central core region 102. In an alternate embodiment, as best illustrated in FIG. 11, the second set 134 of heat exchanging passageways 130, having a length greater than the truncated first set 132 of heat exchanging passageways 130, include a flared end portion 204, so as to have a larger diameter at a distal end portion 206 than that of a central portion in the central core region 102, such as indicated by the middle length 182 of FIG. 9. In the embodiment of FIG. 11, illustrated is a portion of the second set 134 of heat exchanging passageways 130 having a generally cylindrical shape in the central core region 102 that transitions to a larger diameter hexagonal shape at the distal end portions 206. Alternatively, any shaped end portion having a larger diameter than that portion of the heat exchange passageway 130 in the core region 102 is anticipated, such as quadrilateral, triangular, or the like. Similar to the casting method as previously described, brazing is a mature and low-cost manufacturing process.

Figure 12:
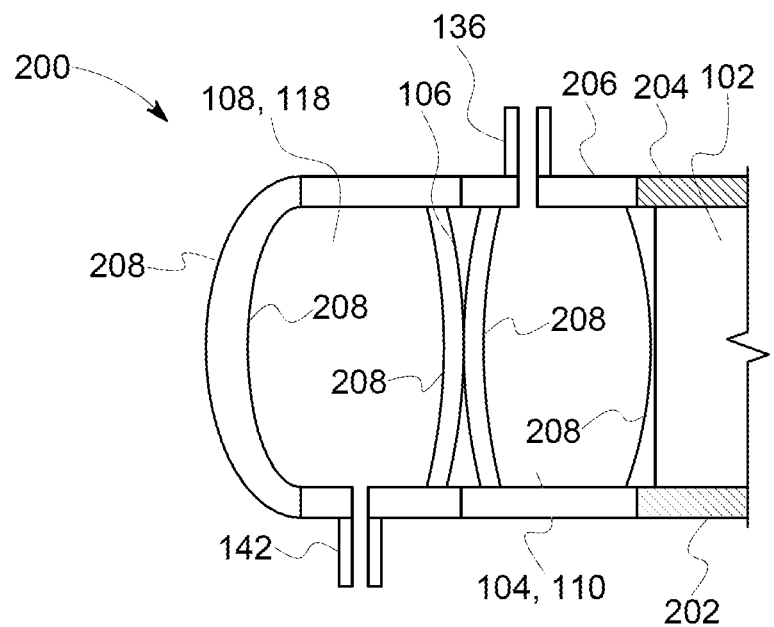
FIG. 12 is a schematic view of a semi-ellipsoidal plenum end, in accordance with one or more embodiments shown or described herein.

Referring now to FIG. 12, the final consideration for the heat exchanger 100 and more particularly the tube-matrix recuperator described herein, is the shell design. In the central core region 102, the heat exchanging passageways 130 will maintain the integrity of the structure due to the internal fluid pressures. For the purposes of moving and securing the heat exchanger 100, in an embodiment generally referenced 200, features, such as a core shell 204 may be required. Providing these moving and securing features in the central core region 102, such as the core shell 204, may be accomplished during the casting method thereof. Alternatively, a separate core shell 204 may be cast or machined and fit over the cast or brazed central core region 102 later in the process. In an embodiment, the inner and outer plenums, and more particularly the plurality of inner plenums 104, of which only the first fluid inlet plenum 110 is illustrated, and the plurality of outer plenums 108, of which only the second fluid outlet plenum 118 is illustrated, require a plenum shell 206 capable of containing the high temperature and pressure fluid therein. In an embodiment, the plenum shells 206 are formed and welded to the core shell 204 and the plurality of tube plates 106. It should be noted that while FIG. 4 illustrates generally planar, or flat shaped, axial ends of each of the inner and outer plenum 104, 108, semi-ellipsoidal shaped axial ends 208 such as illustrated in FIG. 12 may be utilized to more optimally maintain the pressure therein. FIG. 12 illustrates how such semi-ellipsoidal axial ends 208 may be employed in the inner and outer plenums 104, 108 of the heat exchanger 100. In alternate embodiments, other shapes may be advantageous for use in the pressure vessel, such as, but not limited to, flanged disk heads, torispherical heads, dished hemispherical heads, dished elliptical heads, full ellipsoidal heads, full hemispherical heads, or the like. All of these geometric shapes can result in a thinner shell to hold the same pressure compared to a flat disk.

Accordingly, a heat exchanger, and more particularly an exemplary embodiment of a recuperator for supercritical $CO_2$ power cycles is disclosed. The heat exchanger as disclosed provides for the casting or brazing of a central core region and a plurality of tube plates about a plurality of heat exchanging passageways. The casting and brazing processes for forming the central core region and the plurality of tube plates are robust to holding temperature and pressure while also being very cost effective. The heat exchanger as disclosed provides an effectiveness in the range of 92-98% and the ability to withstand pressures in excess of 800 bar and temperatures greater than 500° C.

It should be understood that the foregoing relates only to the preferred embodiments of the present application and that numerous changes and modifications may be made herein by one of ordinary skill in the art without departing from the general spirit and scope of the invention as defined by the following claims and the equivalents thereof. Such changes and modifications may include, but are not limited to, the use of alternating flow directions of a tube-side flow in any cross flow heat exchanger with a parallel unmixed flow of at least one fluid where an even temperature distribution without hot spots is desired.

The invention claimed is:

1. A heat exchanger for exchanging heat between two fluid flows in counter-flow arrangement comprising:
  a core region having opposed distal ends and defining a length therebetween, the core region including a first set of heat exchanging passageways disposed at least partially therein the core region and a second set of heat exchanging passageways disposed at least partially therein the core region; and
  a plenum region, disposed adjacent each one of the opposed distal ends of the core region, each plenum region including a fluid inlet plenum, a fluid outlet plenum and a tube plate disposed therebetween the fluid inlet plenum and the fluid outlet plenum, each plenum region defined by non-planar ends,
  the first set of heat exchanging passageways defining a first tube-side fluid flow path for a first fluid and the second set of heat exchanging passageways defining a second tube-side fluid flow path for a second fluid, wherein the second set of heat exchanging passageways have a length longer than the first set of heat exchanging passageways, each of the heat exchanging passageways of the first set of heat exchanging passageways and the second set of heat exchanging passageways extending from one of the fluid inlet plenums to one of the fluid outlet plenums, and wherein each of the first set of heat exchanging passageways are in contact against at least one of the second set of heat exchanging passageways; and
  wherein the core region includes a metal cast about the heat exchanging passageways of the first set of heat exchanging passageways and the second set of heat exchanging passageways, such that when the casting process is complete, the metal secures the first set of heat exchanging passageways in contact against at least one of the second set of heat exchanging passageways.

2. The heat exchanger of claim 1, wherein a plurality of solid rods are disposed between each distal end portion of the heat exchanging passageways of the second set of heat exchanging passageways to maintain spacing therebetween.

3. The heat exchanger of claim 1, wherein a distal end portion of each of the heat exchanging passageways of the second set of heat exchanging passageways is flared to maintain spacing therebetween.

4. The heat exchanger of claim 1, wherein the first tube-side fluid flow and the second tube-side fluid flow are capable of containing high-pressure fluid flows greater than 800 bar and temperatures higher than 500° C.

5. The heat exchanger of claim 4, wherein the first tube-side fluid flow and the second tube-side fluid flow are one of a liquid, a vapor or a gas.

6. The heat exchanger of claim 1, wherein the plurality of heat exchanging passageways of the first set of exchanging passageways and the plurality of heat exchanging passageways of the second set of heat exchanging passageways have similar shapes, diameters, circumferences or combinations thereof.

7. The heat exchanger of claim 1, further comprising a core shell disposed about the core region.

8. The heat exchanger of claim 1, further comprising a plenum shell disposed about each of the plenum regions.

9. The heat exchanger of claim 1, wherein each of the fluid inlet plenums and fluid outlet plenums include semi-ellipsoidal shaped axial ends.

10. The heat exchanger of claim 1, wherein the heat exchanger is a recuperator.

11. The heat exchanger of claim 1, wherein the heat exchanger is a recuperator for supercritical $CO_2$ power cycles.

12. A heat exchanger for exchanging heat between two fluid flows in counter-flow arrangement comprising:
  a core region having a first end, a second end and defining a length therebetween,
  a first set of heat exchanging passageways and a second set of heat exchanging passageways disposed at least partially therein the core region;
  a first fluid inlet plenum disposed adjacent the first end of the core region and a first fluid outlet plenum disposed adjacent the second end of the core region, the first fluid inlet plenum including a non-planar end;
  a second fluid inlet plenum disposed adjacent the first fluid outlet plenum and a second fluid outlet plenum disposed adjacent the first fluid inlet plenum, the second fluid inlet plenum including a non-planar end; and
  a tube plate disposed between the second fluid outlet plenum and the first fluid inlet plenum and a tube plate disposed between the first fluid outlet plenum and the second fluid inlet plenum, the first set of heat exchanging passageways defining a first tube-side fluid flow path for a first fluid, the first set of heat exchanging passageways extending from the first fluid inlet plenum to the first fluid outlet plenum, the second set of heat exchanging passageways defining a second tube-side fluid flow path in for a second fluid, the second set of heat exchanging passageways extending from the second fluid inlet plenum to the second fluid outlet plenum, and wherein each of the first set of heat exchanging passageways are in contact against at least one of the second set of heat exchanging passageways, wherein the core region includes a metal formed in a casting process about the first set of heat exchanging passageways and the second set of heat exchanging passageways, such that when the casting process is complete, the metal secures the first set of heat exchanging passageways in contact with at least one of the second set of heat exchanging passageways.

13. The heat exchanger of claim 12, wherein a plurality of solid rods are disposed between each distal end portion of the heat exchanging passageways of the second set of heat exchanging passageways to maintain spacing therebetween.

14. The heat exchanger of claim 12, wherein a distal end portion of each of the heat exchanging passageways of the second set of heat exchanging passageways is flared to maintain spacing therebetween.

15. The heat exchanger of claim 12, further comprising a core shell disposed about the core region.

16. The heat exchanger of claim 12, further comprising a plenum shell disposed about each of the plenum regions.

17. The heat exchanger of claim 12, wherein each of the fluid inlet plenums and fluid outlet plenums include semi-ellipsoidal shaped axial ends.

18. The heat exchanger of claim 12, wherein the heat exchanger is a recuperator.

19. A method of fabricating a heat exchanger for exchanging heat between two fluid flows in counter-flow arrangement comprising:

casting a first set of heat exchanging passageways and a second set of heat exchanging passageways to form a core region, the core region having opposed distal ends and defining a length therebetween, the first set of heat exchanging passageways truncated proximate the opposed distal ends of the core region and the second set of heat exchanging passageways extending a length longer than a length of the first set of heat exchanging passageways, wherein when the casting is complete, the metal secures the first set of heat exchanging passageways in contact against at least one of the second set of heat exchanging passageways;

casting a tube plate about opposed distal ends of each heat exchanging passageway of the second set of heat exchanging passageways to define a plenum region adjacent the opposed distal ends of the core region, each of the plenum regions including a fluid inlet plenum and a fluid outlet plenum the tube plate disposed therebetween the fluid inlet plenum and the fluid outlet plenum, the fluid inlet plenum and the fluid outlet plenum each including a non-planar end; and disposing a core shell about the core region and a plenum shell about each of the plenum regions.

20. The method of claim 19, wherein casting a tube plate about opposed distal ends of each heat exchanging passageway of the second set of heat exchanging passageways to define a plenum region adjacent the opposed distal ends of the core region, includes forming the fluid inlet plenums and fluid outlet plenums having semi-ellipsoidal shaped axial ends.

* * * * *